United States Patent [19]
Budman et al.

[11] Patent Number: 5,957,082
[45] Date of Patent: Sep. 28, 1999

[54] ROTATABLE FOOD DISPENSER

[75] Inventors: Sandra Budman, Rockville, Md.;
James Cotter, Ashland, Ohio

[73] Assignee: Horseballs, Ltd., Rockville, Md.

[21] Appl. No.: 09/042,652

[22] Filed: Mar. 17, 1998

[51] Int. Cl.$^6$ .............................. A01K 5/00; A01K 29/00
[52] U.S. Cl. .............................................. 119/54; 119/710
[58] Field of Search .............................. 119/51.01, 51.03, 119/51.5, 53, 53.5, 54, 56.1, 702, 707, 709–711; 446/166, 168, 170; 222/167, 169, 164

[56] References Cited

U.S. PATENT DOCUMENTS

| | | |
|---|---|---|
| 841,283 | 1/1907 | Tjossem . |
| 1,006,182 | 10/1911 | Cousin ................................... 119/711 |
| 1,190,028 | 7/1916 | Smith . |
| 1,226,474 | 5/1917 | Dawson . |
| 1,569,990 | 1/1926 | Lovering . |
| 2,752,725 | 7/1956 | Unsworth ............................... 446/166 |
| 3,028,704 | 4/1962 | Runbaugh .............................. 446/166 |
| 3,134,360 | 5/1964 | Lewis . |
| 3,648,403 | 3/1972 | Gommel ................................. 119/711 |
| 3,696,549 | 10/1972 | Zilius ..................................... 446/166 |
| 4,823,738 | 4/1989 | Gold . |
| 5,758,604 | 6/1998 | Jorgensen .............................. 119/711 |
| 5,813,366 | 9/1998 | Mauldin, Jr. ........................... 119/707 |

FOREIGN PATENT DOCUMENTS 2 253 329   9/1992   United Kingdom .

OTHER PUBLICATIONS

Unknown article, p. 42.
Unknown article (1 page).

*Primary Examiner*—Thomas Price

[57] ABSTRACT

A drum-shaped feed dispenser has a hollow body in the shape of a generally prolate spheroid with truncated longitudinal ends. The hollow body is made of a lightweight material such as plastic, and granular feed can be poured into the hollow body through one end. A circumferential band of the hollow body at the longitudinal center of the drum has an annual shape defining a central portion of the drum. The hollow body includes a plurality of longitudinal recessed channels extending from the end walls of the drum to the edges of the central portion. The end of each recessed channel adjacent the central portion of the drum is defined by a transverse side wall. A feed dispensing aperture through which the granular feed can pass is formed in at least one of the side walls. When an animal engages the drum to impart rotation, feed drops out of the apertures as they pass through the downward-facing direction. The vertical orientation of the side walls discourages rain water from entering the interior of the drum through the apertures, and the channels, which slope away from the center portion, provide a water run-off path which draws water away from the apertures. Asymmetric placement of the channels imparts an eccentric weighting which controls the rotation and resting position of the drum. The drum can be rolled directly on the ground or rotated while mounted on a stationary base.

37 Claims, 11 Drawing Sheets

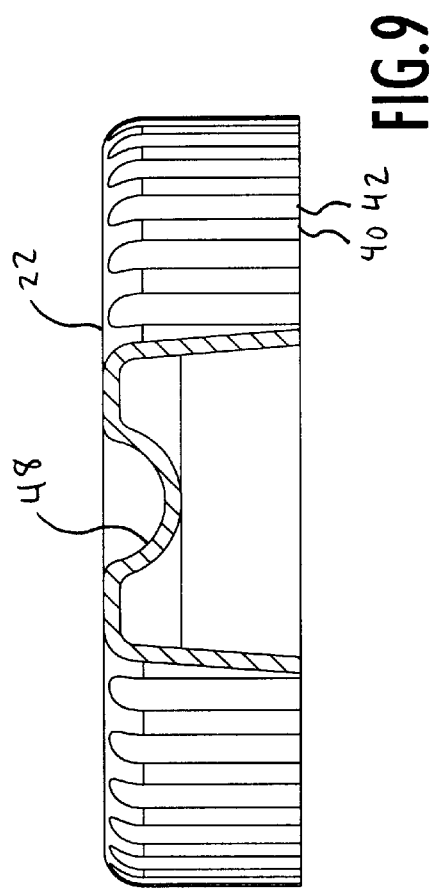
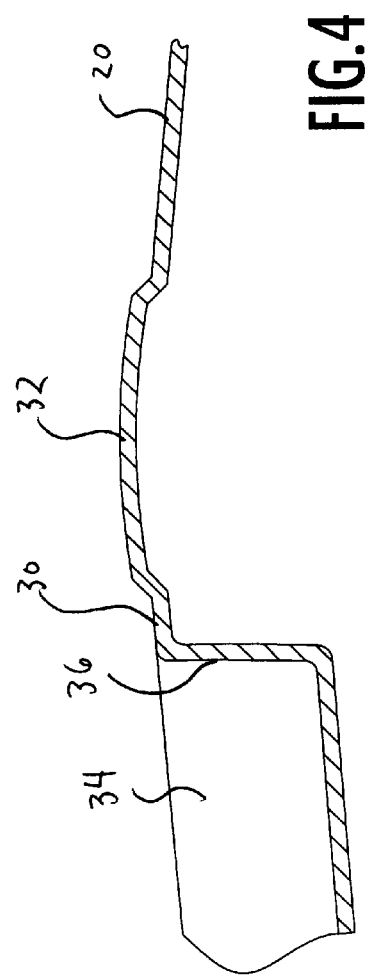

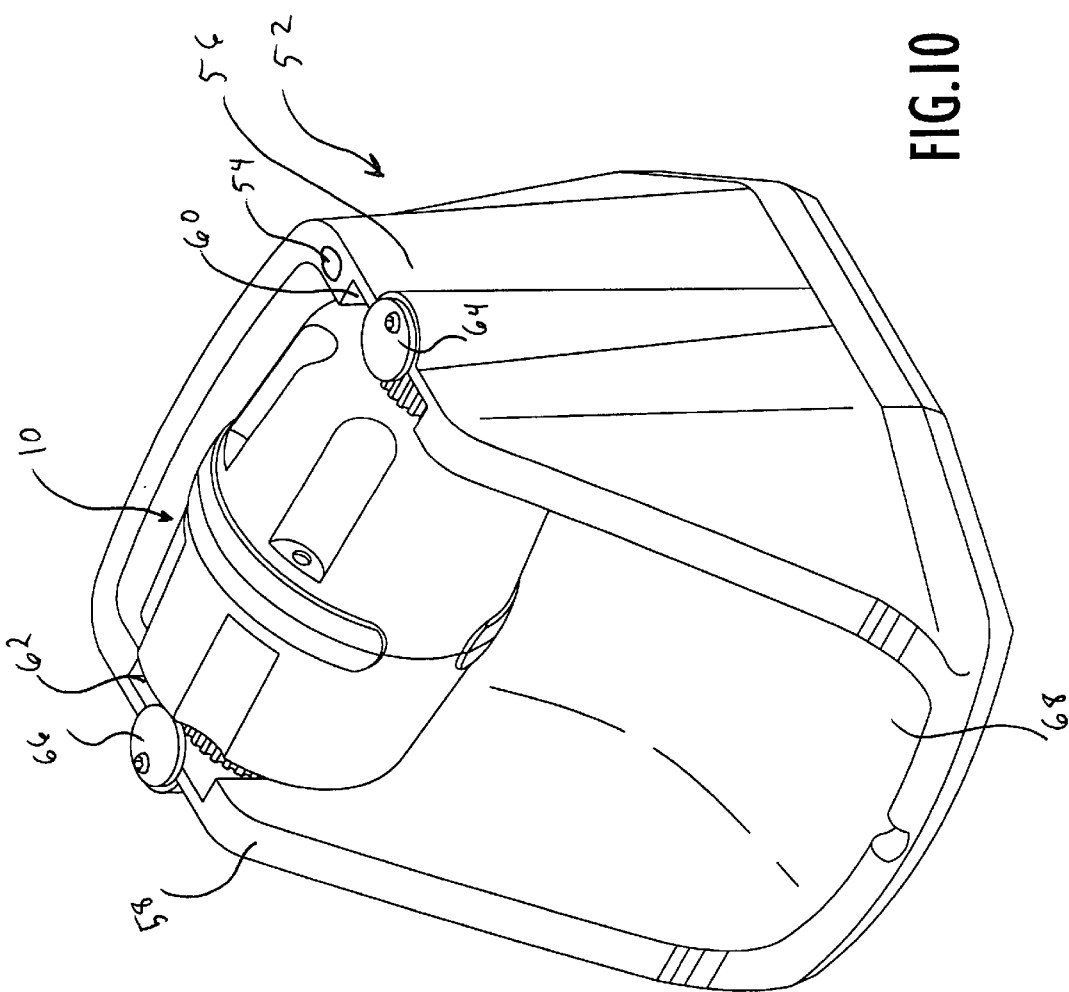

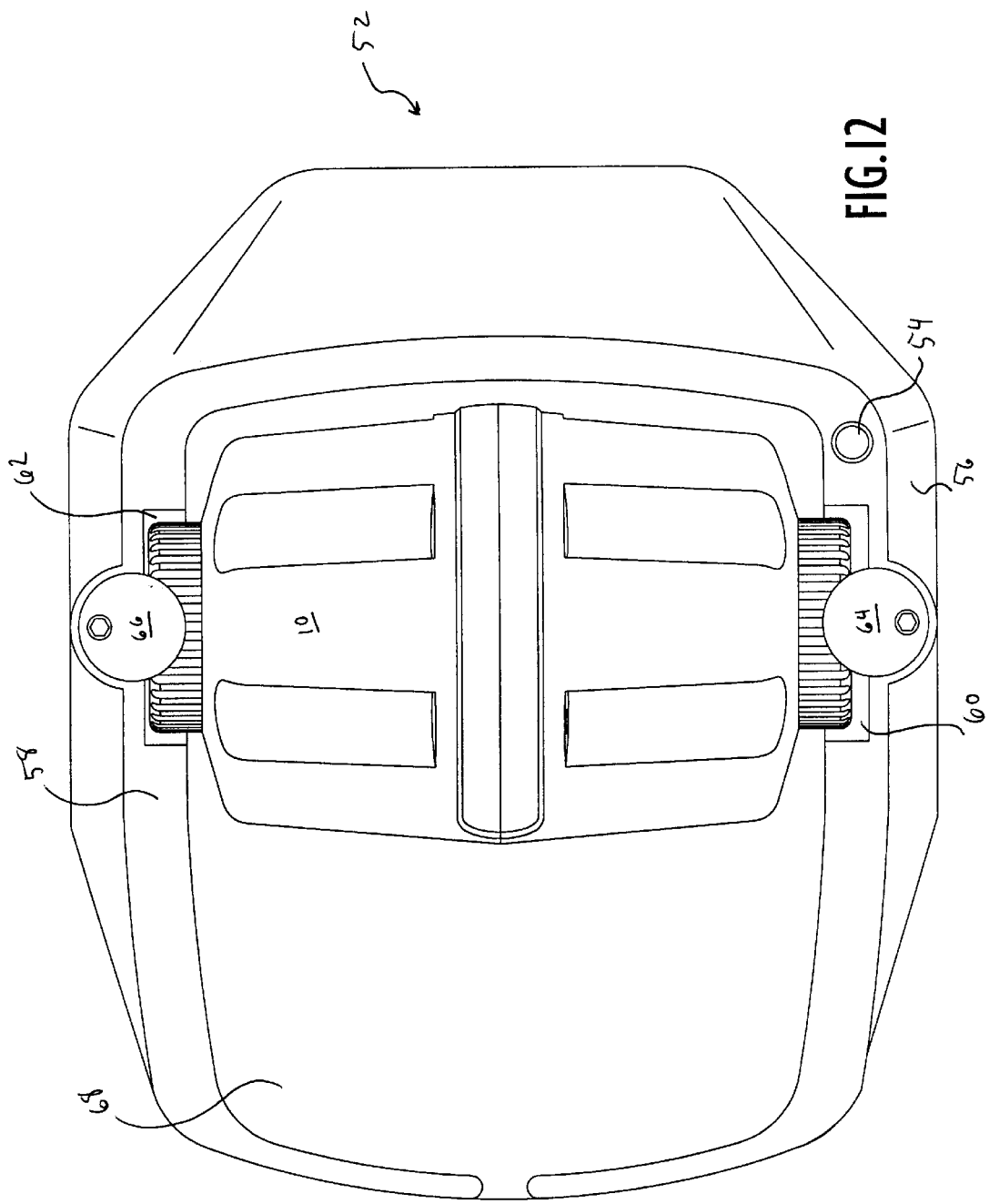

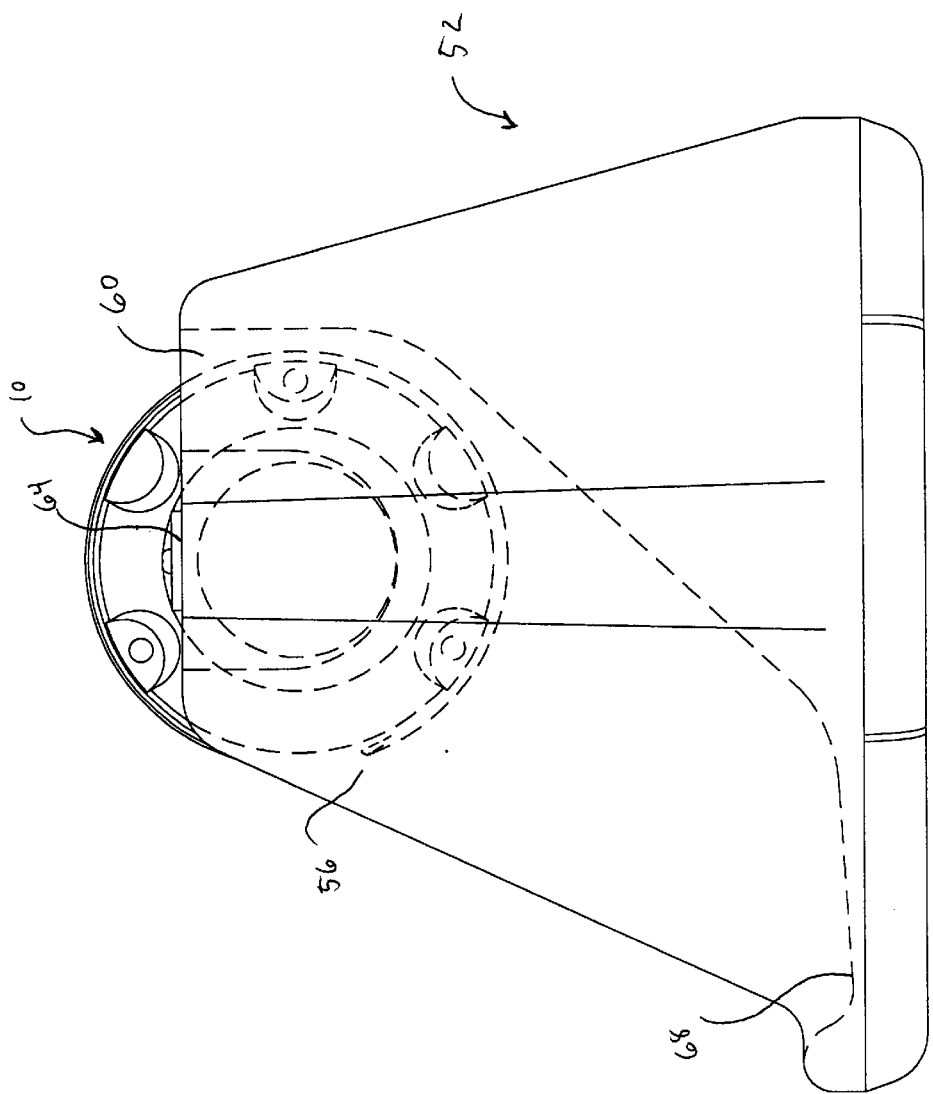

ROTATABLE FOOD DISPENSER

BACKGROUND OF THE INVENTION

1. Field of the Invention

The present invention relates to rotatable feed dispenser for a horse or the like. More particularly, the present invention relates to a hollow-bodied, drum-like feed dispenser having apertures through which feed stored in the drum is dispensed when the drum, which is rolled on the ground or mounted on a base, is rotated about a central axis.

2. Description of the Related Art

Animal-operated feed dispensing devices have long been used to control the rate of consumption and the amount of feed consumed by animals. In particular, many animals can be trained or will instinctively attempt to empty the contents of a feed dispenser by moving or agitating the dispenser via a pushing, pulling or dropping action. Rotary mechanisms which dispense feed through holes or slots when rotated by an animal have been found to be particularly useful for controlling the rate at which feed or the like is dispensed.

For example, in U.S. Pat. No. 841,283 to Tjossem, there is disclosed a salt feeder for animals comprising a container mounted to rotate about a horizontal axis and formed by horizontally extending spaced slats. As the animal licks the slats, the device rotates to permit salt to fall from between the slats into a trough-like feeding dish.

In U.S. Pat. No. 1,190,028 to Smith, there is disclosed a hog feeder in the form of a drum rotatable about a horizontal axis and having plural orifices at spaced peripheral locations. A central band has plural orifices defined therein and is disposed about the drum in a manner to be rotated relative to the drum so that the orifices in the band can move relative to the orifices in the drum, thereby changing the size of the path for feed through the orifices. The drum is described as being rotatable by the head of the animal engaging the drum to impart rotary movement thereto. A trough is located below the drum to collect feed dispensed therefrom.

U.S. Pat. No. 1,226,474 to Dawson discloses an animal feeder in the form of a rotatable drum having multiple perforations for dispensing feed from within the drum. A trough collects feed that drops from the drum.

U.S. Pat. No. 1,569,990 to Lovering discloses an animal feed box with a rotatable drum having its outermost periphery in the form of rounded blades against which animals rub their noses to cause drum rotation and permit feed stored above the drum to be controllably delivered from between the blades into the trough.

U.S. Pat. No. 3,134,360 to Lewis discloses an animal feeding device in which plural receptacles are suspended from different spokes of a wheel or drum so that each receptacle can be selectively positioned at an opening in an outer frame of the wheel to permit access by an animal to feed disposed in the receptacle.

U.S. Pat. No. 4,823,738 to Gold discloses an animal food dispensing machine that is similar to a conventional gum ball machine. Specifically, the food is stored in a transparent container, and a measured amount of the food is discharged through a chute at the base of the container when an animal, such as a dog, engages a lever or spoke of an actuator wheel.

UK Patent Publication No. GB 2,253,329 discloses an activity device for animals comprising an outer casing having an external cross-section of polygonal shape and a separate food storage container within the outer casing. When the device is rolled on the ground, a controlled amount of feed is discharged from the food storage container and is dispensed through apertures in the outer casing.

While known rotary feed dispensers encompass a wide variety of designs, features and functions, as exemplified by the above publications, no known feed dispensers are capable of being used for their designed purpose both when rolled on the ground (e.g., in a pasture) and when rotating while mounted on a stationary base. Further, known rotary feed dispensers either lack means for preventing external moisture, such as rain water, from entering the dispenser or have complicated mechanisms for preventing feed from getting wet. Moreover, none of the known feed dispensers takes advantage of an eccentric shape or an eccentric weighting of the feed dispenser to facilitate agitation of the feed and egress of the feed through dispensing apertures.

SUMMARY OF THE INVENTION

It is an object of the present invention to provide a feed dispenser which operates when rolled directly on the ground and when rotated while mounted on a stationary base.

It is a further object of the present invention to prevent ingress of rain water and the like into the feed dispenser.

Another object of the present invention is to control the angular position at which the feed dispenser comes to rest after rotating.

Yet another object of the present invention is to control the feed dispenser's tendency to roll using eccentric weighting and/or shaping of the feed dispenser.

Still another object of the present invention is to increase egress of feed from the feed dispenser using eccentric weighting and/or shaping of the feed dispenser.

The aforesaid objects are achieved individually and in combination, and it is not intended that the present invention be construed as requiring two or more of the objects to be combined unless expressly required by the claims attached hereto.

According to the present invention, a feed dispenser comprises a drum having a hollow body which is in the shape of a generally prolate spheroid with truncated ends along the major axis. The hollow body is made of a lightweight material such as plastic, and granular feed can be poured into the hollow body through one end. A circumferential band of the hollow body at the longitudinal center of the drum has a substantially annual shape defining a central portion of the drum. The hollow body includes a plurality of longitudinal recesses forming concave channels extending from the end walls of the drum to the edges of the central portion. The recessed channels provide edges which enable an animal to engage the drum with a pushing or pulling motion to impart rotation.

The end of each recessed channel adjacent the central portion of the drum is defined by a transverse side wall extending between the concave surface of the channel and the longitudinal edge of the central portion. Each side wall is nearly parallel with respectto a plane disposed perpendicular to longitudinal axis; accordingly, when the drum rotates about the horizontally oriented longitudinal axis, the transverse side walls are nearly vertical. A feed dispensing aperture through which the granular feed can pass is formed in at least one of the side walls.

As the drum rotates about the longitudinal axis, gravity causes the granular feed contained within the hollow body to shift toward the portion of the body nearest the ground. Due to the sloped longitudinal surface of the drum, the feed tends to move toward the central portion of the drum as the feed shifts with rotation. Each channel imparts an agitation action to the feed which further facilitates movement of the feed toward the center portion. The central portion of the drum provides an interior trough for retention of the feed in the center of the drum in close proximity to the apertures. Rotation and agitation of the drum causes the feed near the apertures to drop through apertures to the exterior of the drum as the channel adjacent the aperture passes through the downward-facing position.

The vertical orientation of the side walls discourages rain water from entering the interior of the drum through the apertures, and the recessed channels, which slope away from the center portion, provide a water run-off path which draws water away from the apertures.

The drum can either be rolled directly on the ground or rotated while mounted on a stationary base. Specifically, at the longitudinal ends of the drum are longitudinally-projecting center end hubs which can be mounted in U-shaped brackets or retaining members in slidable communication therewith, such that animal-initiated movement of the drum causes rotation, with friction between the end hubs and retaining brackets controlling the amount of rotation. The circumference of the end hubs are ribbed to reduce the surface area that contacts a retaining member, thereby reducing frictional forces and facilitating rotation of the drum.

According to an exemplary embodiment of the present invention, a stationary base has a hollow plastic body with a generally flat bottom surface for resting on the ground. The base includes left and right side vertical support walls having U-shaped recesses from which the drum is suspended. The drum is lowered into the recesses and secured with pivotal retaining members. Beneath the drum, the base has a steeply sloped longitudinal surface leading to a feed tray. Feed which drops from the drum slides down the sloped surface into the feed tray for consumption by an animal.

In general, the drum can be mounted on any stationary brackets which slidably communicate with the end hubs, permitting relatively easy rotation of the drum. For example, the drum may be mounted on brackets extending from a wall or a fence.

Preferably, the drum has an eccentric weighting and/or shape in the circumferential direction. Specifically, a radially raised rib is formed on an outer surface of the central portion around most of the circumference of the drum, leaving a gap between ends of the rib in the circumferential direction. The rib serves as a center rolling surface when the drum is rotated on the ground about its longitudinal axis. The gap between ends of the rib imparts an erratic rolling action which inhibits continuous rolling of the drum when pushed. When the drum rolls on the ground, the erratic rolling action imparted by the gap between ends of the rib contributes to agitation of the feed and egress of the feed through the apertures. The rib can have a greater thickness than the rest of the body to increase the eccentric weighting resulting from the circumferential gap between ends of the rib.

The longitudinal surface of the drum, which slopes away from the longitudinal center of the drum allows the drum to pitch to either side while rolling on the ground, bringing portions of longitudinal surface of the drum into sporadic contact with the ground and contributing to the erratic rolling action which inhibits continuous rolling of drum.

The recessed channels are preferably spaced non-uniformly around the circumference of the drum. The asymmetric placement of the channels results in a slightly eccentric weighting of drum which contributes to an erratic rolling action and inhibits continuous rotation of drum when pushed. The asymmetric placement of the channels also contributes to agitation of the feed and egress of the feed through the apertures. To accentuate the eccentric weighting of drum, the thickness of hollow body can vary over the surface of drum to concentrate more weight in a specific area or to shift the center of gravity of the drum.

The eccentric weighting or shape of the drum, by virtue of the shape or irregular thickness of the hollow body or by virtue of the tendency of feed to settle in particular locations within the irregularly-shaped interior of the drum, can also be advantageously used to give the drum a tendency to come to rest in a particular angular position; accordingly, the apertures can be positioned to decrease the likelihood that they face directly upward (to further limit ingress of rain) or downward (to prevent continuous egress of the feed) when the drum is stationary.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

BRIEF DESCRIPTION OF THE DRAWINGS

FIG. 4 is a sectional view of the central portion of the feed dispenser along section line IV—IV shown in FIG. 2.

FIG. 9 is a sectional view of the cap access slot along section line IX—IX shown in FIG. 5.

FIG. 10 is a perspective view of a feed dispenser including the rotatable drum shown in FIG. 1 mounted on a base.

FIG. 12 is a top view in plan of the feed dispenser shown in FIG. 10.

FIG. 13 is a side view in elevation of the feed dispenser shown in FIG. 10.

DESCRIPTION OF THE PREFERRED EMBODIMENTS

Figure 1:
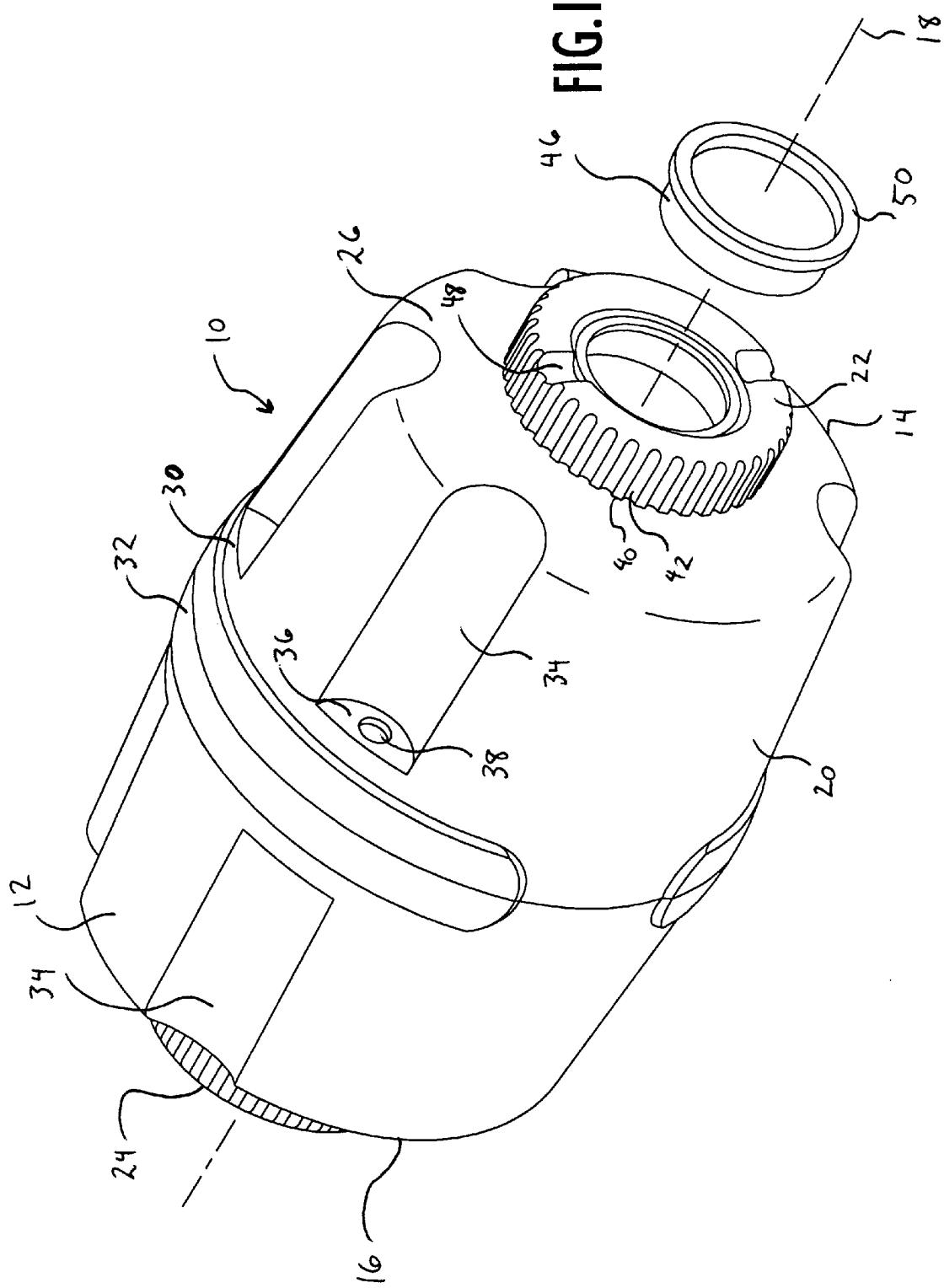
FIG. 1 is perspective view of a drum-shaped feed dispenser in accordance with an exemplary embodiment of the present invention.

FIG. 1 is a perspective view of a feed dispenser in accordance with an exemplary embodiment of the present invention. While specific dimensions are used to describe the feed dispenser of the exemplary embodiment, it is to be understood that these dimensions are provided by way of example only and are not in any way limiting on the scope of the invention. As shown in FIG. 1, the feed dispenser comprises a drum 10 having a hollow body 12 which is in the shape of a generally prolate spheroid with truncated ends 14 and 16 along the major axis. The term "generally prolate spheroid" refers to a shape that is elongated and has a cross sectional area which gradually decreases from the longitudinal center to the ends, and does not require that the surface of hollow body 12 be strictly prolate spheroid.

More specifically, hollow body 12 is elongated in a longitudinal direction along a center longitudinal or major axis 18 which defines an axis of rotation for drum 10. At the longitudinal center, the diameter of drum 10 is approximately 10.25 inches. The cross sectional shape of drum 10 in a plane perpendicular to longitudinal axis 18 is generally circular (see FIGS. 1, 2 and 5), with a gradually decreasing diameter from the longitudinal center of drum 10 to each of the truncated longitudinal ends 14 and 16, with longitudinal surface 20 of drum 10 sloping toward longitudinal axis 18 from the longitudinal center to the longitudinal ends 14 and 16 of drum 10 at an angle of approximately 5° (see FIG. 2). In the exemplary embodiment, the 5° slope is essentially linear; thus, while the exemplary drum 10 is "generally" prolate spheroid (with truncated ends), it is not strictly prolate spheroid.

Figure 2:
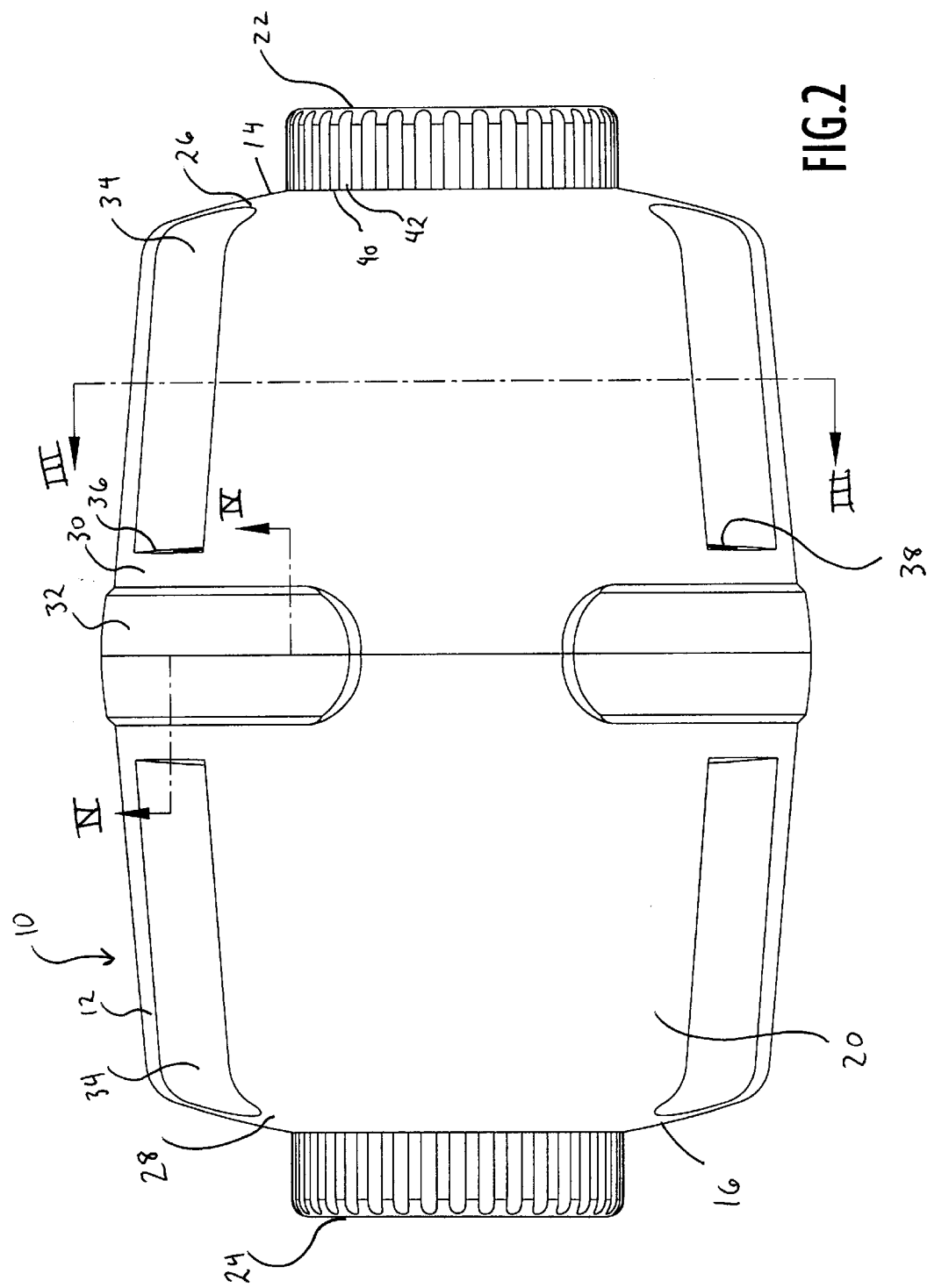
FIG. 2 is a front view in elevation of the feed dispenser shown in FIG. 1.

As shown in FIG. 2, truncated longitudinal ends 14 and 16 respectively comprise longitudinally-projecting center end hubs 22 and 24 and concentric lateral end walls 26 and 28 respectively extending radially between end hubs 22 and 24 and longitudinal surface 20. End hubs 22 and 24 each have a diameter of approximately 4.5 inches and a width in the longitudinal direction of approximately 1 inch. The overall length of drum 10 in the longitudinal direction is approximately 15.75 inches, inclusive of end hubs 22 and 24.

Drum 10 is suitable for storing granular animal feed or the like. Specifically, feed can be poured into hollow body 12 through end hub 22, as described in greater detail hereinbelow.

A circumferential band of hollow body 12 at the longitudinal center of drum 10, having a width of approximately 3 inches in the longitudinal direction, has a substantially annular shape defining a central portion 30 of drum 10. As best seen in FIGS. 1, 2, 4 and 6, a radially raised rib 32, having a width of approximately 2 inches in the longitudinal direction and a height in the radial direction of approximately 0.12 inches, is formed on an exterior surface of central portion 30 around most of the circumference of drum 10, leaving a gap of approximately 2.5 inches between ends of rib 32 in the circumferential direction. The edges of rib 32 are beveled at an angle of approximately 45°. Optionally, a logo displayed on longitudinal surface 20 can extend through the circumferential gap on central portion 30 between the ends of rib 32.

Rib 32 serves as a center rolling surface when drum 10 is rotated on the ground about longitudinal axis 18. The gap between ends of rib 32 imparts an erratic rolling action which inhibits continuous rolling of drum 10 when pushed. Although shown in FIG. 4 as having the same thickness as the rest of body 12, rib 32 can have a greater thickness to increase the eccentric weighting resulting from the circumferential gap between ends of rib 32. Additionally, the sloped longitudinal surface 20 allows longitudinal axis 18 of drum 10 to pitch to either side while rolling on the ground, bringing portions of longitudinal surface 20 into sporadic contact with the ground and contributing to the erratic rolling action which inhibits continuous rolling of drum 10.

Figure 3:
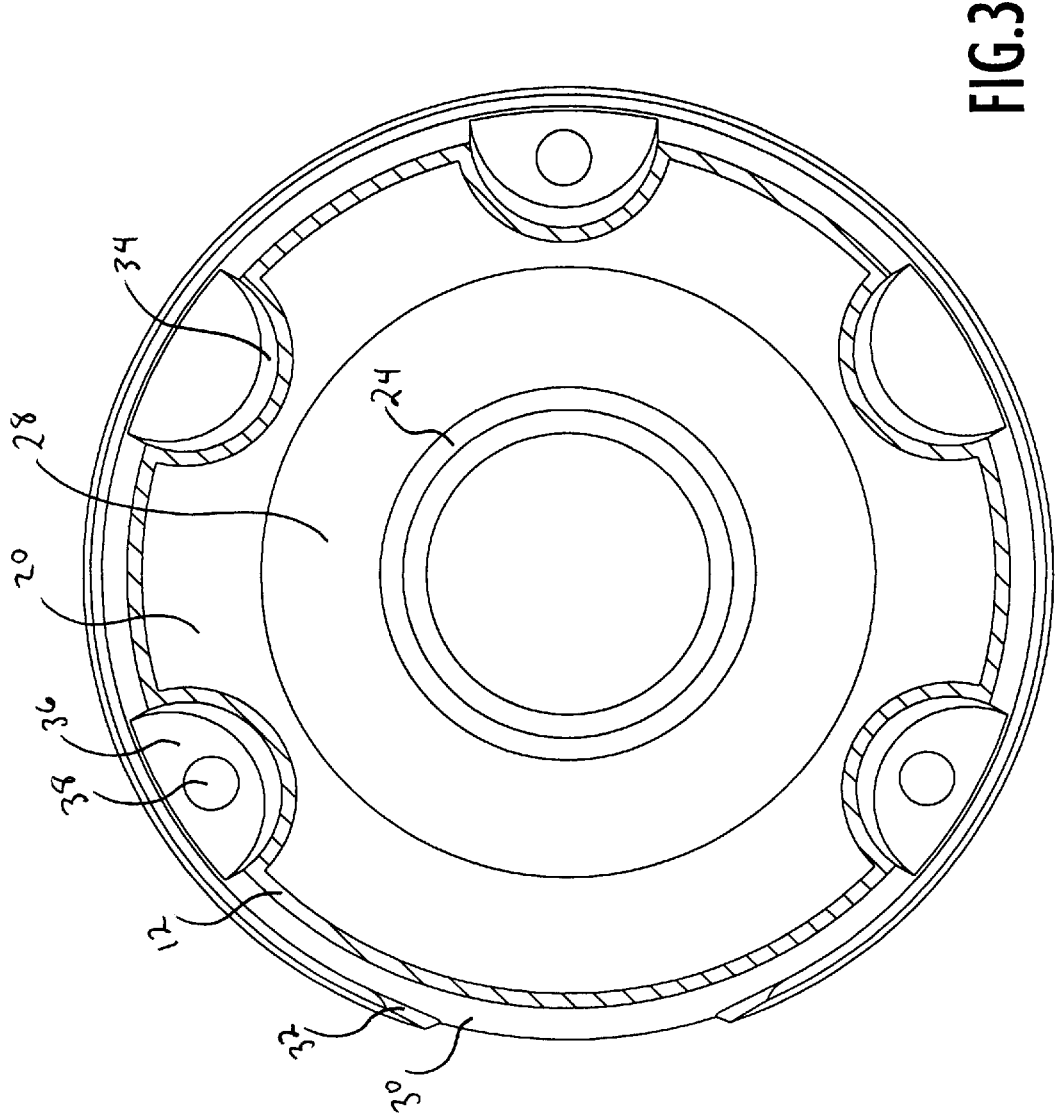
FIG. 3 is a sectional view of the feed dispenser along section line III—III shown in FIG. 2.
Figure 5:
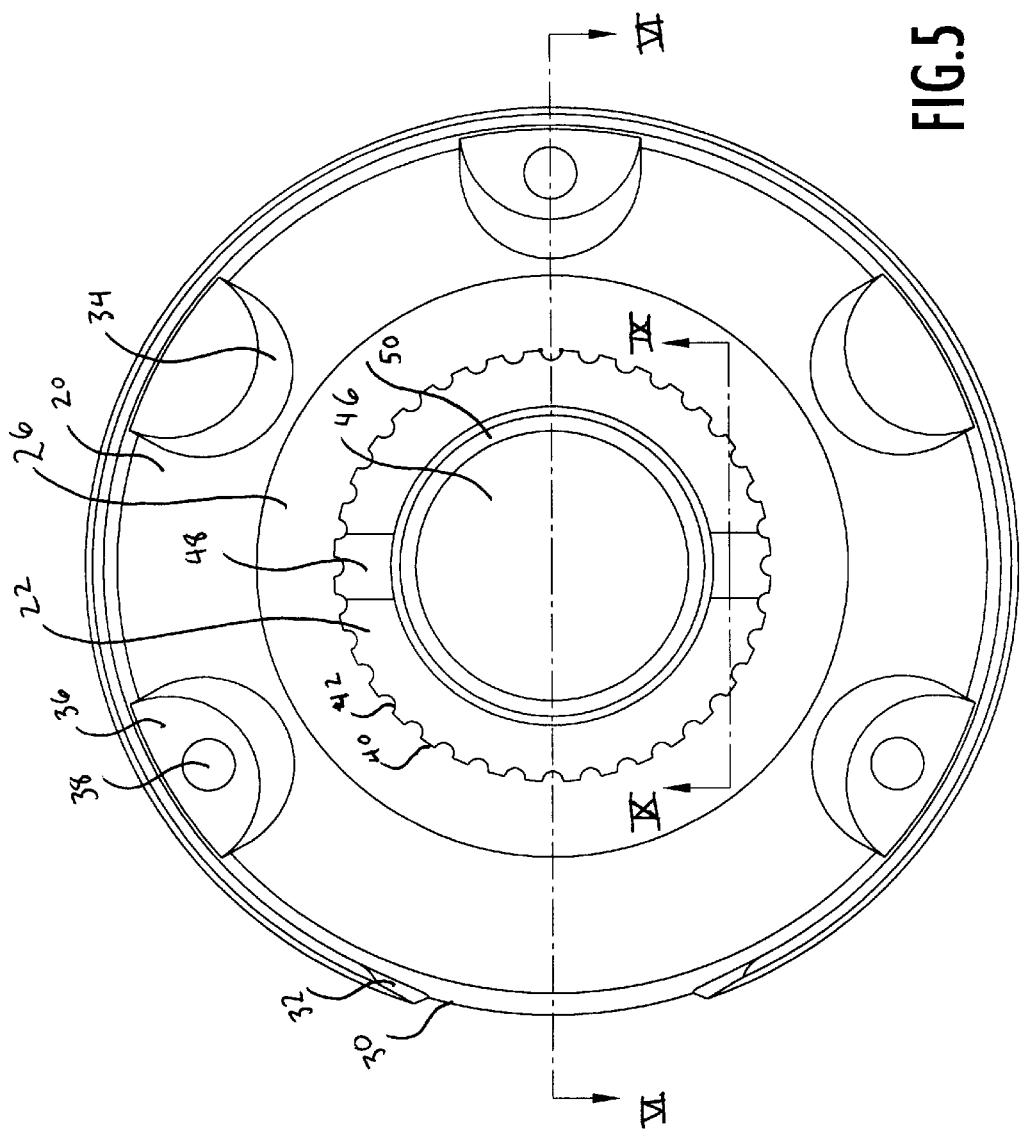
FIG. 5 is an end view in elevation of the feed dispenser shown in FIG. 1.

As shown in perspective in FIG. 1, in cross-section in FIG. 3, and from an end view in FIG. 5, the shape of hollow body 12 includes a plurality of longitudinal recesses forming concave channels 34 extending from end walls 26 and 28 to the edges of central portion 30. More specifically, five recessed channels 34 are formed on each longitudinal side of central portion 30 for a total of ten channels. Each recessed channel has a width of approximately 2 inches along the circumference of body 12 and has a generally semi-circular cross-section in a plane perpendicular to longitudinal axis 18, with a radius of curvature of approximately 1 inch. Semi-circular, as defined herein, means a portion of a circle and not necessarily a half-circle. "Generally semi-circular" includes other curvatures that are not strictly circular, e.g., elliptical, etc.

While recessed channels can be spaced uniformly along the circumference of drum 10, for reasons explained hereinbelow, it is particularly advantageous to space recessed channels 34 non-uniformly to make drum 10 circumferentially asymmetric. In the exemplary embodiment shown in the figures, on each side of central portion 30, each channel 34 is spaced apart (on center) along the circumference of drum 10 from at least one adjacent channel 34 by an angle of 60°. Two adjacent channels on each side of central portion 30 are spaced apart (on center) by an angle of 120°, leaving therebetweeen a relatively large non-recessed area on longitudinal surface 20. The gap between ends of rib 32 is preferably centered in the large non-recessed area of longitudinal surface 20 in the circumferential direction. Like the non-recessed portion of longitudinal surface 20, recessed channels 34 slope at an angle of approximately 5° toward longitudinal axis 18 from central portion 30 to truncated ends 14 and 16.

Recessed channels 34 provide edges which enable an animal to more easily engage drum 10 with a pushing or pulling motion to impart rotation. The asymmetric placement of recessed channels 34 results in a slightly eccentric weighting of drum 10 which contributes to an erratic rolling action and inhibits continuous rotation of drum 10 when pushed. To accentuate the eccentric weighting of drum 10, the thickness of hollow body 12 can vary over the surface of drum 10 to concentrate more weight in a specific area or to shift the center of gravity of drum 10. While the recessed channels have been described with reference to the particular arrangement shown in the figures, the invention is not limited to any particular number, spacing or size of channels, and any practical arrangement of longitudinal channels sloping away from central portion 30 is considered to be within the scope of the invention.

The end of each recessed channel 34 adjacent central portion 30 is defined by a transverse side wall 36 extending between the semi-circular concave surface of recessed channel 34 and the longitudinal edge of central portion 30 (see FIGS. 1, 3, 4 and 5). As best seen in FIG. 4, each side wall 36 is at a slight angle, e.g., 5°, with respect to a plane disposed perpendicular to longitudinal axis 18 (i.e., side wall 36 is nearly parallel to this plane). Accordingly, when drum 10 rotates about horizontally-lying longitudinal axis 18, side wall 36 is nearly vertical.

Formed in at least one side wall 36 is a feed dispensing aperture 38 through which the granular feed can pass. As shown in FIGS. 1, 3 and 5, the aperture 38 can be circular, although aperture 38 can be any shape and size that permit egress of feed. The number of side walls 36 through which an aperture 38 is formed can vary and is a function of the desired rate at which feed is dispensed and the ease with which the particular feed passes through the aperture(s) 38. It is economically preferable to fabricate drum 10 with a minimum number (e.g., 1 to 4) of small apertures which will allow a minimal amount of feed to be dispensed. Individual users can then adapt drum 10 if more feed flow is desired by drilling additional apertures in the remaining side walls or by widening the existing apertures or both.

According to another approach, drum 10 can be fabricated with large apertures 38 in most or all of side walls 36 which allow a maximal amount of feed to be dispense. Plugs or semi-plugs can then be used to plug or partially plug any number of apertures 38 to reduce the rate at which feed is dispensed in accordance with individual users' needs. For example, the plugs could be snap-in plugs and the semi-plugs could be ring-shaped snap-in plugs which reduce the diameter of the aperture but do not completely plug the aperture. This approach provides flexibility in adjusting the feed flow rate.

The vertical orientation of side walls 36 (when drum 10 rotates about the horizontally disposed longitudinal axis 18) discourages rain water and the like from entering the interior of drum 10 through apertures 38. Further, since recessed channels 34 are sloped away from center portion 30, they provide a water run-off path toward truncated ends 14 and 16, which draws water away from the vertical side walls 36 located at the center portion ends of the channels 34.

When drum 10 rotates about longitudinal axis 18, with longitudinal axis 18 being oriented horizontally, gravity causes the granular feed contained within hollow body 12 to shift toward the portion of the body 12 nearest the ground. Since the interior longitudinal surface of hollow body 12 (including channels 34) slopes away from longitudinal axis 18 from ends 14 and 16 to center portion 30 at an angle of approximately 5°, as the feed shifts with rotation of drum 10, the feed tends to move toward central portion 30. Each recessed channel 34, which is a raised convex surfaces in the interior of hollow body 12, imparts an agitation action to the feed which further facilitates movement of the feed toward center portion 30. Central portion 30 and rib 32 provide an interior trough for retention of the feed in the center of drum 10 in close proximity to apertures 38. Rotation and agitation of drum 10 cause the feed near apertures 38 to egress through apertures 38 to the exterior of drum 10 as the channel 34 adjacent the aperture 18 passes through the downward-facing position. The asymmetric placement of recessed channels 34 results in a slightly eccentric weighting of drum 10 and eccentric placement of the feed therein, which in turn contributes to an erratic rolling action, further agitation of the feed, and egress of the feed through apertures 38. When drum 10 rolls on the ground, the erratic rolling action imparted by the gap between ends of rib 32 further contributes to agitation of the feed and egress of the feed through apertures 38.

The eccentric weighting or shape of drum 10, by virtue of the shape or irregular thickness of hollow body 12 or by virtue of the tendency of feed to settle in particular locations within the irregularly-shaped interior of drum 10, can also be advantageously used to give drum 10 a tendency to come to rest in a particular angular position. For example, drum 10 can be weighted or shaped relative to the position of apertures 18 such that drum 10 tends to come to rest with apertures 18 positioned to the side rather than upward, to prevent ingress of rain water, or downward, to prevent feed from pouring out when drum 10 is stationary. Thus, in the exemplary embodiment, apertures 18 can be positioned relative to the circumferential gap between ends of rib 32 and the large non-recessed portion of longitudinal surface 20 to reduce the likelihood of apertures 18 facing a particular direction.

In addition to being rolled on the ground, drum 10 can be mounted on a retaining bracket or base and rotated about longitudinal axis 18 while remaining translationally stationary. Specifically, end hubs 22 and 24 can be mounted in U-shaped brackets or retaining members in slidable communication therewith, such that animal-initiated movement of the drum 12 causes drum 10 to rotate, with friction between end hubs 22 and 24 and their respective brackets or retaining members controlling the amount of rotation.

As shown in FIG. 1, 2 and 5, the outer circumference of end hubs 22 and 24 are ribbed in the longitudinal direction to reduce the surface area that contacts a retaining member, thereby reducing frictional forces and facilitating rotation of drum 10.

Figure 6:
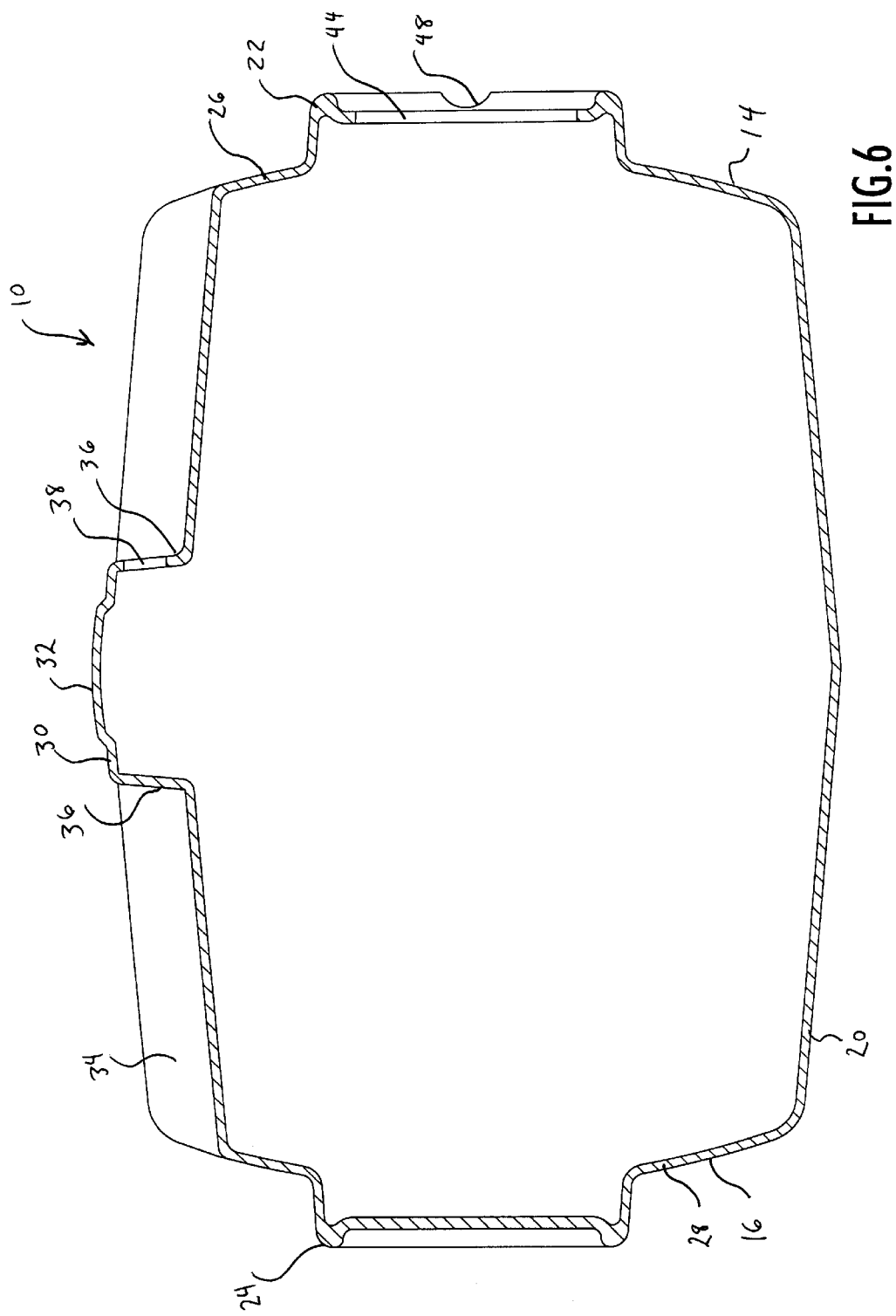
FIG. 6 is sectional view of the feed dispenser along section line VI—VI shown in FIG. 5.
Figure 8:
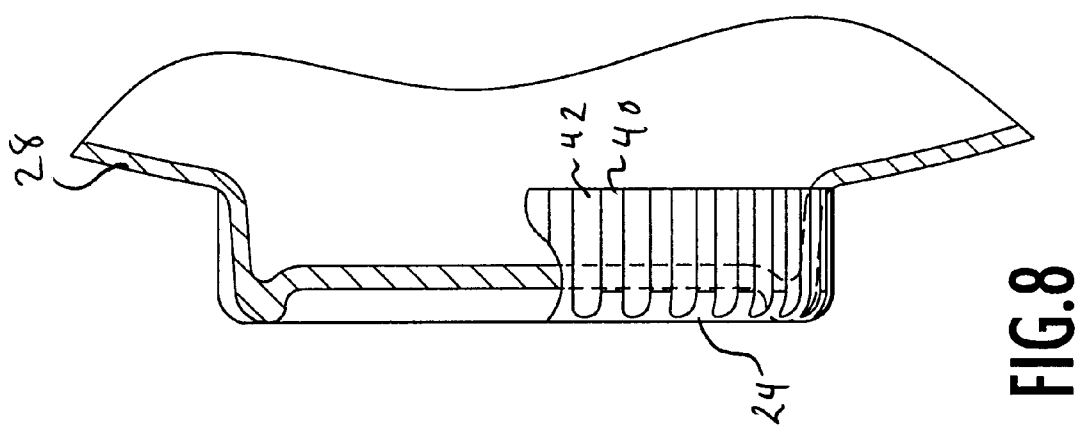
FIG. 8 is a partially sectional side view of the end hub along section line VIII—VIII shown in FIG. 7.
Figure 7:
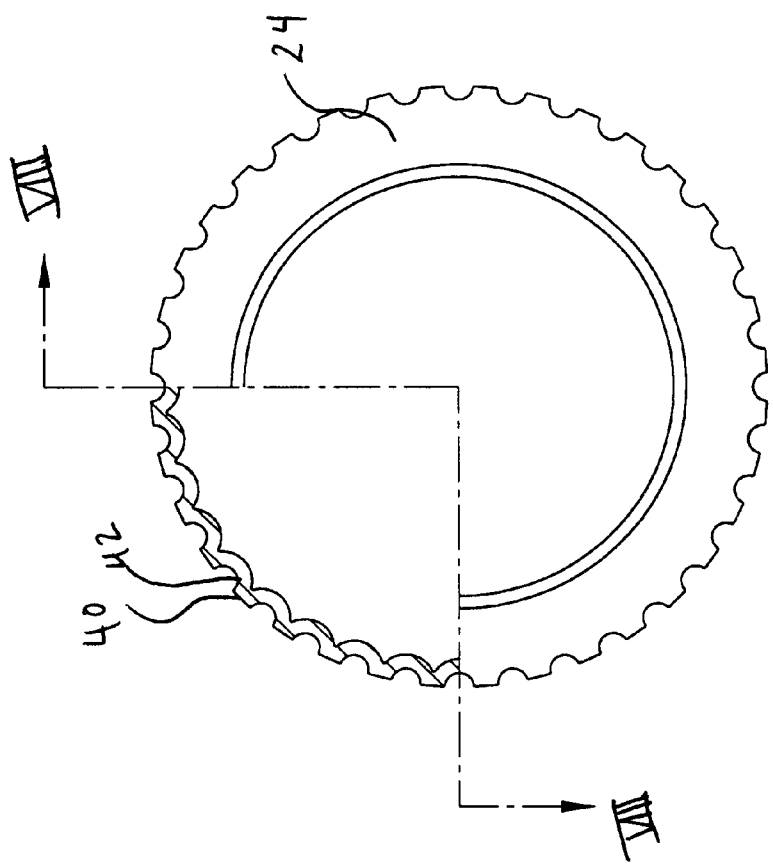
FIG. 7 is a partially broken end view of the end hub of the feed dispenser shown in FIG. 1.

The configurations of end hubs 22 and 24 are shown in greater detail in FIGS. 6–9. Specifically, as shown in FIGS. 7 and 8, end hub 24 has thirty-six ribs equally-spaced apart at 10° on center. The recesses 42 between ribs are generally semi-circular with a radius of approximately 0.075 inches, leaving a gap of approximately 0.15 inches between 0.243 inch wide ribs. In addition to reducing friction, the ribbed circumferential surface of end hubs 22 and 24 provides strength and molding concentricity. As seen in FIGS. 6, 8 and 9, the circumferential surfaces of end hubs 22 and 24 slope slightly (e.g., at an angle of 4°) toward longitudinal axis 18 with increasing longitudinal distance from the center of drum 10. The ribbed circumferential surface of end hub 22 is similar to that of end hub 24.

As shown in FIG. 6, for each of end hubs 22 and 24, the radially extending surface of the end hub, having a 4.5 inch diameter, is longitudinally recessed by 0.25 inches (relative to the longitudinal outer end of the end hub) over the center 3.5 inches of the end hub diameter, leaving a longitudinally protruding ring of width 0.5 inches lying along a plane disposed perpendicular to longitudinal axis 18 at the longitudinal outer end of the end hub (i.e., adjacent the edge of the ribbed circumferential surface). The circular recess increases the hub strength.

A circular opening 44 having a three inch diameter is formed in the recessed radial portion of end hub 22 to allow granular feed to be poured into the interior of drum 10 (see FIG. 6). As shown in FIGS. 1 and 5, a snap-in cap 46 securely plugs opening 44 when drum 10 is in use to prevent feed from dropping through opening 44. The circular recess in end hub 22 serves to protect snap-in cap 46. Access slots 48 having a depth in the longitudinal direction of approximately 0.25 inches and a radius of curvature of 0.38 inches are formed in end hub 22 and extend radially outward from opening 44, such that access slots 48 extend beneath a radially extending lip 50 of snap-in cap 46 (see FIGS. 1, 5 and 9). Snap-in cap 46 can be removed by inserting fingers or a tool into one or both of access slots 48 and applying force to lip 50 to urge cap 46 out of opening 44.

Drum 10 and snap-in cap 46 can be fabricated from a lightweight plastic material, such as polyethylene or the like, using an injection molding process or other conventional shaping method. The thickness of drum 10 must be sufficient to withstand normal wear and tear associated with rough handling by a horse, and should not crack or buckle when bearing a significant percentage of the body weight of a horse.

An exemplary embodiment of a stationary base 52 which allows drum 10 to rotate without significant translational movement is shown in perspective in FIG. 10. Base 52 has a hollow plastic body with a generally flat bottom surface for resting on the ground. As seen from the plan view in FIG. 12, the width of base 52 narrows towards the rear so that base 52 can be placed in close proximity to a corner of a stall or the like, with the longitudinal axis (front to rear) of base 52 at a 45° angle with respect to the stall walls. Base 52 is approximately 24 inches long (front to rear), 20 inches wide (from side to side) and 18 inches high. Base 52 can be filled through a fill hole 54 disposed on a top surface thereof with sand or water to provide stability and to prevent base 52 from being moved or upset by an animal. As another means of stabilizing base 52, stakes can be driven through loops formed in base 52 to secure base 52 to the ground. When resting on relatively firm ground, serrations extending from a bottom surface of base 52 can also be used to prevent movement of base 52.

Base 52 includes left and right side vertical support walls 56 and 58 from which drum 10 is suspended. Specifically, the top ends of the interior facing surfaces of support walls 56 and 58 have respective recesses 60 and 62 formed therein for respectively receiving end hub 22 and end hub 24. As viewed from the side (end view of drum 10) in FIG. 13, recesses 60 and 62 are generally U-shaped with an opening at the top, vertical side walls, and a semi-circular bottom (i.e., the recesses are U-shaped in a plane perpendicular to the longitudinal axis of drum 10). As seen in FIG. 12, recesses 60 and 62 have a generally rectangular cross-section in a horizontal plane.

Figure 11:
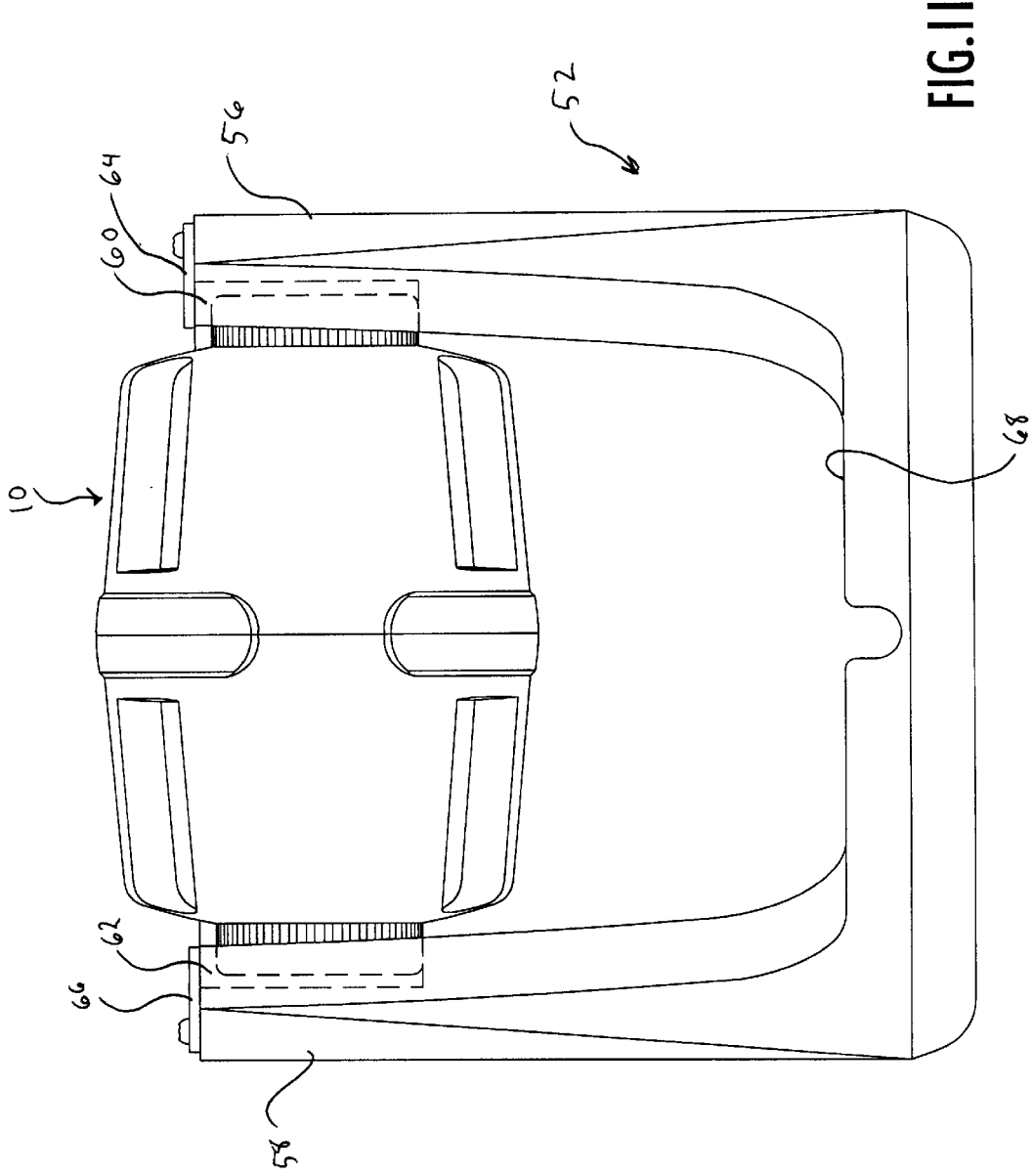
FIG. 11 is a front view in elevation of the feed dispenser shown in FIG. 10.

Drum 10 is lowered into recesses 60 and 62 such that ribs 40 on the circumference of end hubs 22 and 24 come into contact with the lower, semi-circular surface of recesses 60 and 62. When an animal engages drum 10, ribs 40 slide along the surface of recesses 60 and 62, allowing drum 10 to rotate about longitudinal axis 18. The ribbed surfaces of end hubs 22 and 24 reduce the friction between end hubs 22 and 24 and the recessed surfaces to facilitate rotation of drum 10 (see FIGS. 11 and 13).

As shown in FIGS. 10 and 12, horizontal retaining discs 64 and 66 prevent drum 10 from being accidentally dislodged from recesses 60 and 62, respectively. Specifically, discs 64 an 66 are pivotally mounted on bolts or the like which extend from a top surface of base 52 through an off-center point of discs 64 and 66. To secure drum 10, discs 64 and 66 can be pivoted in the horizontal plane to cover a portion of the top opening of recesses 60 and 62. By pivoting discs 64 and 66 away from recesses 60 and 62, drum 10 can be removed for filling or for use without base 52 (i.e., directly on the ground).

As best shown in FIG. 13, between side support walls 56 and 58, the inner longitudinally extending surface of base 52 is nearly vertical near the rear of base 52 (behind drum 10), has a relatively steep slope (e.g., 45°) in the longitudinal center of base 52 (beneath drum 10), and has a slight slope toward the front of base 52, forming an area which serves as a feed tray 68. As drum 10 is rotated and the feed drops therefrom, the feed slides down the relatively steep slope and collects in the feed tray for consumption by an animal. A vertically extending lip extends across the front of base 52 to prevent the feed from sliding out of feed tray 68.

While a stationary base having a feed tray has been described, it will be understood that other stationary mountings for drum 10 are within the scope of the invention. For example, drum 10 may be mounted on brackets extending from a wall or a fence.

Having described preferred embodiments of a new and improved rotatable feed dispenser, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A feed dispenser comprising:
   a hollow-bodied drum having an interior adapted to store granular feed;
   said drum having a shape of a generally prolate spheroid elongated in a longitudinal dimension with truncated longitudinal ends;
   a central portion of said drum being configured to facilitate rotation of said drum about a longitudinal major axis when in contact with the ground;
   said drum including a plurality of transverse walls extending from the central portion toward the longitudinal major axis, at least one of the transverse walls having an aperture formed therethrough to allow egress of the granular feed upon rotation of said drum.

2. The feed dispenser according to claim 1, wherein said drum includes a plurality of recessed channels extending longitudinally from the truncated longitudinal ends to the central portion, each of the transverse walls extending from a surface of a respective one of the recessed channels to the central portion, thereby defining a side wall of the respective one of the recessed channels.

3. The feed dispenser according to claim 2, wherein the recessed channels are spaced non-uniformly along the circumference of said drum such that said drum is asymmetric with respect to the longitudinal major axis.

4. The feed dispenser according to claim 1, wherein the central portion is an annual band formed at the longitudinal center of said drum.

5. The feed dispenser according to claim 1, wherein the transverse walls are within approximately 5° of vertical when the longitudinal major axis is oriented horizontally.

6. The feed dispenser according to claim 1, wherein a radially raised rib is formed on an exterior surface of the central portion in the circumferential direction, ends of the rib being spaced apart by a gap in the circumferential direction.

7. The feed dispenser according to claim 6, wherein the rib has a greater thickness in the radial direction than other portions of said drum.

8. The feed dispenser according to claim 1, wherein a surface of said drum slopes at an angle of approximately 5° toward the longitudinal major axis from the longitudinal center of said drum to the truncated longitudinal ends.

9. The feed dispenser according to claim 1, wherein each of the truncated longitudinal ends includes a longitudinally projecting end hub.

10. The feed dispenser according to claim 9, wherein each of the end hubs has a ribbed circumferential surface configured to reduce friction when in slidable communication with a retaining member.

11. The feed dispenser according to claim 9, wherein one of the end hubs has an opening adapted to allow the granular feed to be poured therethrough into the interior of said drum, said feed dispenser further comprising a removable cap adapted to be secured in the opening.

12. The feed dispenser according to claim 9, further comprising:
   a stationary base on which said drum is rotatably mounted, said stationary base including U-shaped retaining members in slidable communication with the end hubs of said drum.

13. The feed dispenser according to claim 12, wherein said stationary base includes a feed tray disposed beneath said drum and adapted to collect the granular feed that drops from said drum.

14. The feed dispenser according to claim 13, wherein a width of said stationary base narrows toward the rear of said stationary base.

15. The feed dispenser according to claim 12, wherein said stationary base is suitable for mounting on a wall or a fence.

16. The feed dispenser according to claim 12, wherein said stationary base is affixed to the ground.

17. The feed dispenser according to claim 1, wherein said drum is eccentrically weighted about the longitudinal major axis.

18. The feed dispenser according to claim 1, wherein said drum is eccentrically shaped about the longitudinal major axis.

19. The feed dispenser according to claim 1, further comprising plugs for partially or completely plugging apertures formed in the transverse walls.

20. A method of manufacturing a feed dispenser, comprising the steps of:

a) molding a material into a hollow-bodied drum having a shape of a generally prolate spheroid elongated in a longitudinal dimension with truncated longitudinal ends;

b) configuring a central portion of the drum to facilitate rotation of the drum about a longitudinal major axis when in contact with the ground;

c) forming a plurality of transverse walls extending from the central portion toward the longitudinal major axis; and d) forming an aperture in at least one of the transverse walls, the aperture being configured to allow egress of granular feed stored within the drum upon rotation of the drum.

21. The method according to claim 20, further comprising the step of:

e) forming a plurality of recessed channels extending longitudinally from the truncated longitudinal ends to the central portion of the drum, wherein each of the transverse walls extends from a surface of a respective one of the recessed channels to the central portion, thereby defining a side wall of the respective one of the recessed channels.

22. The method according to claim 21, wherein step e) includes spacing the recessed channels non-uniformly along the circumference of the drum such that the drum is asymmetric with respect to the longitudinal axis.

23. The method according to claim 20, wherein step b) includes forming the central portion as an annual band disposed at the longitudinal center of the drum.

24. The method according to claim 20, wherein step c) includes orienting the transverse walls such that the transverse walls are within approximately 5° of vertical when the longitudinal major axis is oriented horizontally.

25. The method according to claim 20, further comprising the step of:

e) forming a radially raised rib on an exterior surface of the central portion in the circumferential direction, such that ends of the rib being spaced apart by a gap in the circumferential direction.

26. The method according to claim 25, wherein step e) includes forming the rib with a greater thickness in the radial direction than other portions of the drum.

27. The method according to claim 20, wherein step a) includes sloping a surface of the drum at an angle of approximately 5° toward the longitudinal major axis from the longitudinal center of the drum to the truncated longitudinal ends.

28. The method according to claim 20, further comprising the step of:

e) forming each of the truncated longitudinal ends to include a longitudinally projecting end hub.

29. The method according to claim 28, wherein step e) includes forming each of the end hubs with a ribbed circumferential surface configured to reduce friction when in slidable communication with a retaining member.

30. The method according to claim 28, wherein step e) includes forming in one of the end hubs an opening adapted to allow granular feed to be poured therethrough into the interior of the drum, the method further comprising the step of:

f) forming a removable cap adapted to be secured in the opening.

31. The method according to claim 28, further comprising the steps of:

f) molding a stationary base having U-shaped retaining members, the drum being rotatably mountable on the stationary base with U-shaped retaining members in slidable communication with the end hubs of the drum.

32. The method according to claim 31, wherein step f) includes forming the stationary base to include a feed tray disposed beneath the drum and adapted to collect the granular feed that drops from the drum.

33. The method according to claim 32, wherein step f) includes shaping the stationary base such that a width of the stationary base narrows toward the rear of the stationary base.

34. The method according to claim 31, wherein step f) includes forming the stationary base to be mounted on a wall or fence.

35. The method according to claim 31, wherein step f) includes forming the stationary base to be affixed to the ground.

36. The method according to claim 20, wherein the drum is formed to be eccentrically weighted about the longitudinal major axis.

37. The method according to claim 20, wherein the drum is formed to be eccentrically shaped about the longitudinal major axis.

* * * * *